United States Patent
Yurechko

(10) Patent No.: US 12,203,841 B1
(45) Date of Patent: Jan. 21, 2025

(54) PORTABLE TEST SYSTEM FOR UNIFORM CHEMICAL CONCENTRATION TESTING OF PERSONAL PROTECTION PRODUCTS AND METHOD OF USE

(71) Applicant: Combat Capabilities Development Command, Chemical Biological Center, APG, MD (US)

(72) Inventor: Steven A Yurechko, Port Deposit, MD (US)

(73) Assignee: The United States of America as Represented by the Secretary of the Army, Washington, DC (US)

(*) Notice: Subject to any disclaimer, the term of this patent is extended or adjusted under 35 U.S.C. 154(b) by 1105 days.

(21) Appl. No.: 16/904,864

(22) Filed: Jun. 18, 2020

(51) Int. Cl.
| | |
|---|---|
| *G01N 17/00* | (2006.01) |
| *B01L 1/00* | (2006.01) |
| *B01L 1/02* | (2006.01) |
| *E04H 15/20* | (2006.01) |
| *G01M 3/02* | (2006.01) |

(52) U.S. Cl.
CPC ............ *G01N 17/002* (2013.01); *B01L 1/025* (2013.01); *B01L 1/52* (2019.08); *E04H 15/20* (2013.01); *G01M 3/02* (2013.01); *E04H 2015/201* (2013.01); *E04H 2015/206* (2013.01)

(58) Field of Classification Search
CPC .................................................. G01N 17/002
USPC ......................................................... 73/865.6
See application file for complete search history.

(56) References Cited

U.S. PATENT DOCUMENTS

2018/0117492 A1* 5/2018 von Stenglin .......... B01B 1/005
2018/0169286 A1* 6/2018 Henniges ............... A61L 2/208

FOREIGN PATENT DOCUMENTS

CN          207486901 U * 6/2018
WO    WO-2007102798 A1 * 9/2007 ............... A61L 2/18

OTHER PUBLICATIONS

Huang. Machine Translation of CN-207486901-U. Published Jun. 2018. Accessed Jun. 2023. (Year: 2018).*

* cited by examiner

*Primary Examiner* — Walter L Lindsay, Jr.
*Assistant Examiner* — Philip T Fadul
(74) *Attorney, Agent, or Firm* — Ulysses John Biffoni

(57) ABSTRACT

An apparatus for testing personal protection equipment or devices comprising an enclosure body having an air-inflatable support structure that receives an air-transferable chemical and air to maintain a substantially rigid structural integrity; a nozzle connected to the air-inflatable support structure, wherein the nozzle releases air and the air-transferable chemical from the air-inflatable support structure into the interior of the enclosure body for a selected period of time as a concentration of the air-transferable chemical in the interior of the enclosure body is at a steady state of uniformity; and a panel integrated into the enclosure body that passively releases air from the enclosure body.

20 Claims, 14 Drawing Sheets

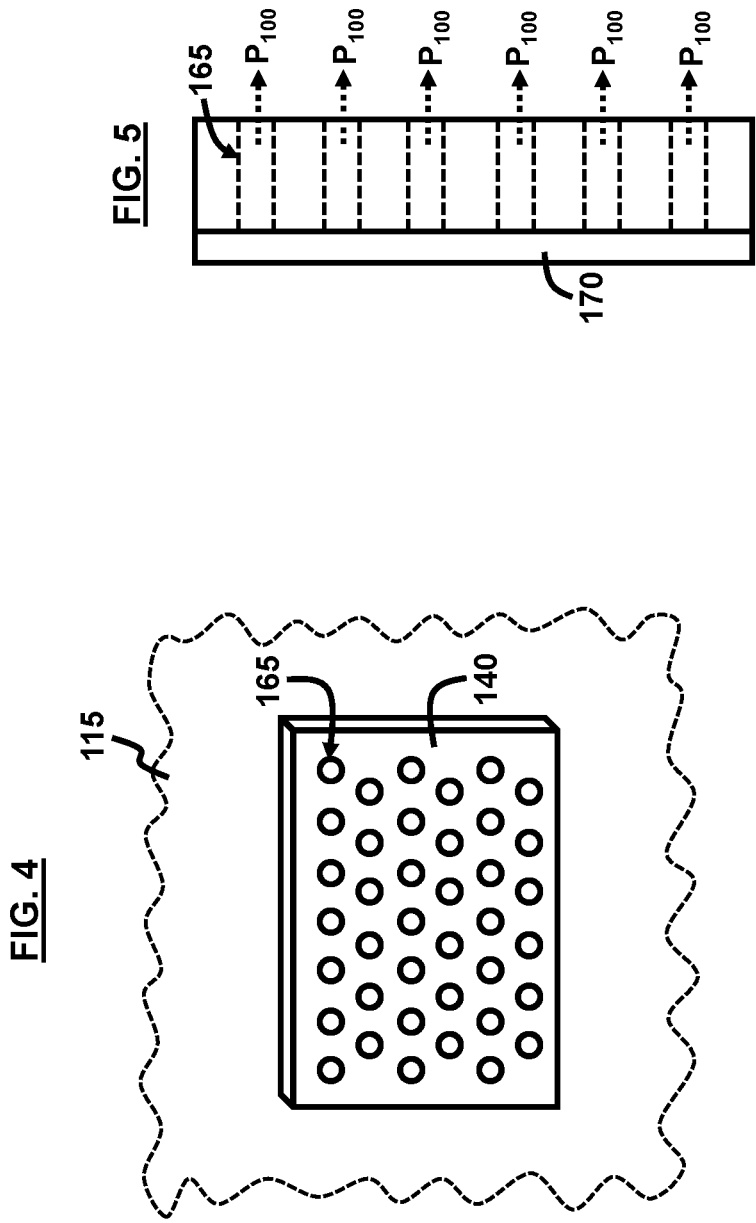

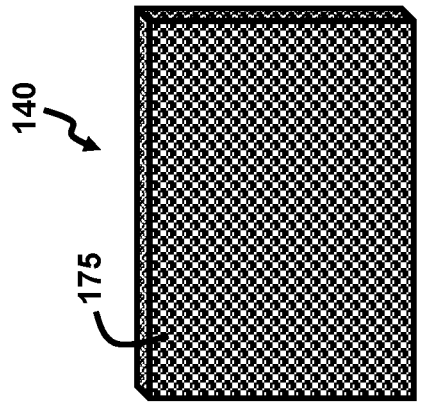
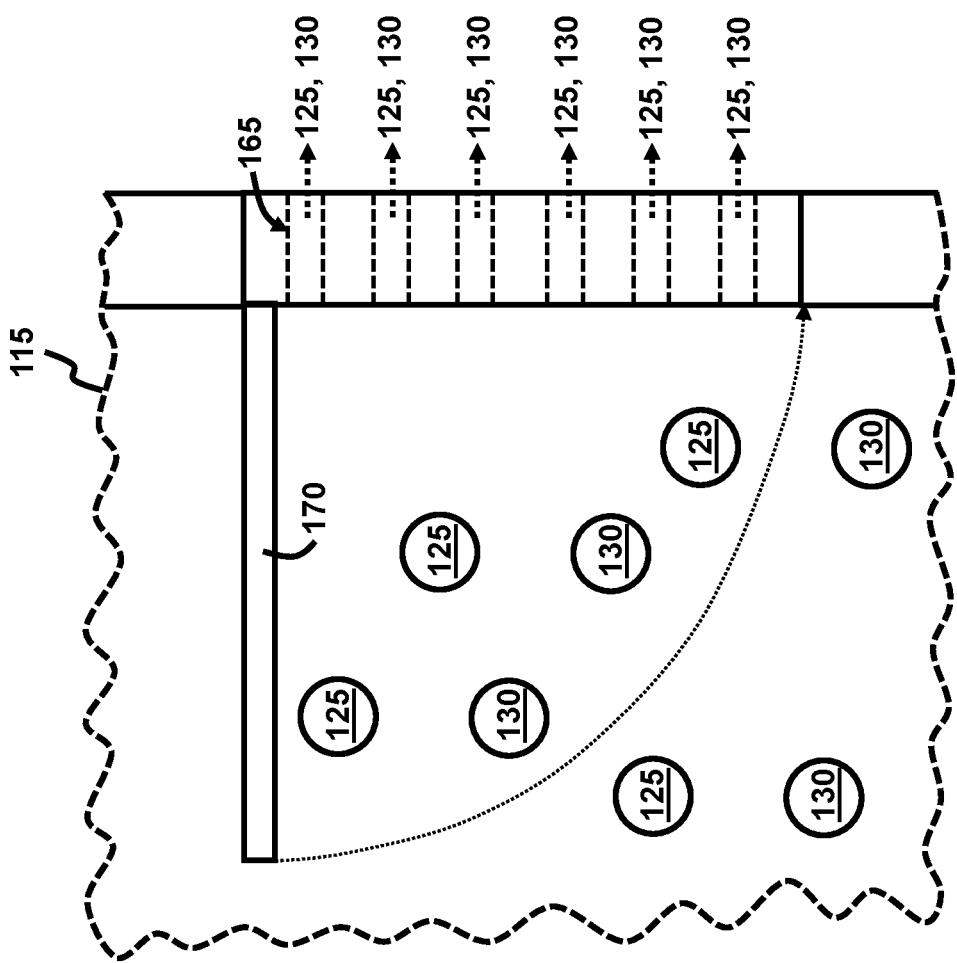

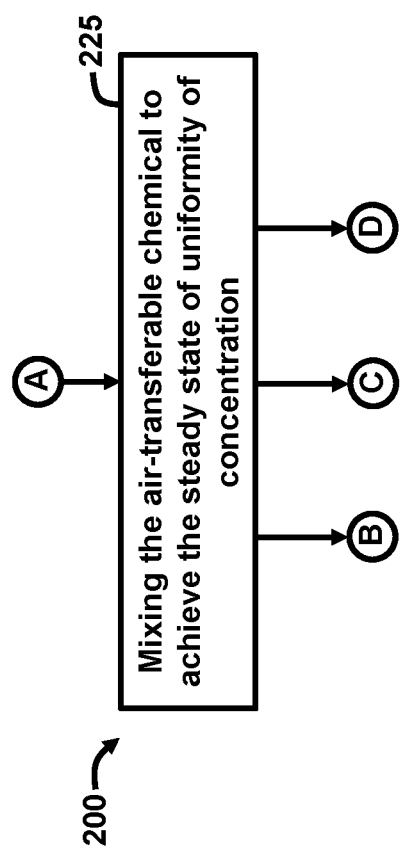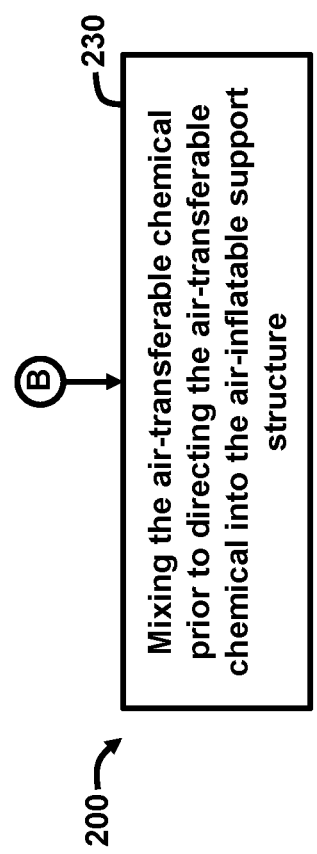

FIG. 8D

200 → © → 235 Mixing the air-transferable chemical in the air-inflatable support structure

FIG. 8E

200 → D → 240 Mixing the air-transferable chemical after releasing the air-transferable chemical into the enclosure body

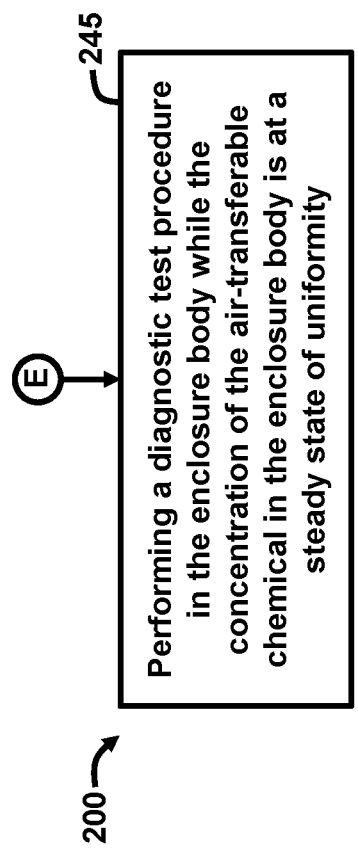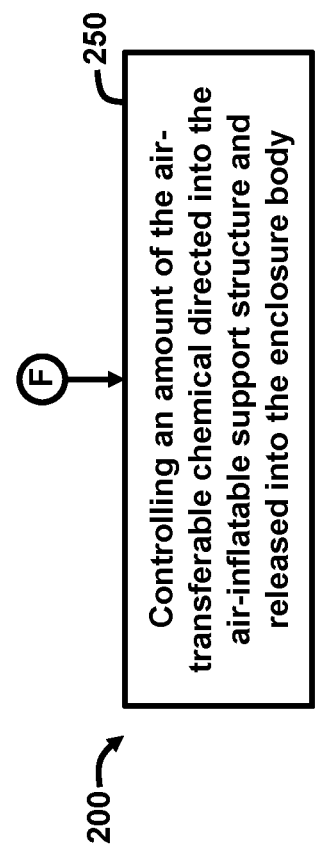
FIG. 8F
FIG. 8G

PORTABLE TEST SYSTEM FOR UNIFORM CHEMICAL CONCENTRATION TESTING OF PERSONAL PROTECTION PRODUCTS AND METHOD OF USE

GOVERNMENT INTEREST

The embodiments herein may be manufactured, used, and/or licensed by or for the United States Government.

BACKGROUND

Technical Field

The embodiments herein generally relate to diagnostic testing systems, and more particularly to systems that provide concentrations of chemical, aerosol, or vapor simulants for testing materials, devices, and other mechanism.

Description of the Related Art

When testing products that are designed to protect users against various airborne threats, the protective products are typically subjected to simulants and the performance of the products is measured. If testing is performed against a simulant that is not uniform or consistent in concentration, the data that is generated to evaluate the threat-resistance provided by the protective products may not be accurate. This can lead to poor design choices for the products in the future, defective products, and expose the users of these products to unsafe conditions when exposed to an actual threat.

SUMMARY

In view of the foregoing, an embodiment herein provides an apparatus or system comprising an enclosure body comprising an air-inflatable support structure that receives air to maintain a substantially rigid structural integrity of the enclosure body while also receiving the air-transferable chemical; a nozzle connected to the air-inflatable support structure, wherein the nozzle releases air and the air-transferable chemical from the air-inflatable support structure into an interior chamber formed by the enclosure body for a selected period of time as a concentration of the air-transferable chemical in the interior chamber of the enclosure body is at a steady state of uniformity; and a panel integrated into the enclosure body that passively releases air from the interior chamber of the enclosure body. The air-transferable chemical may comprise an aerosol. The air-transferable chemical may comprise a vapor. The nozzle may direct the air-transferable chemical at a selected location in the enclosure body. The system and enclosure body may be portable.

Another embodiment provides a test chamber system comprising an enclosure body comprising an air-inflatable support structure; a device for supplying an air-transferable chemical; a fan operatively connected to the air-inflatable support structure and the device, wherein the fan transfers the air-transferable chemical and air into the air-inflatable support structure; at least one nozzle connected to the air-inflatable support structure, wherein the at least one nozzle opens causing the air-transferable chemical and the air to enter into an interior chamber formed by the enclosure body; a sensor in the interior chamber of the enclosure body that detects whether a concentration of the air-transferable chemical in the chamber is at a steady state of uniformity; and a panel integrated into the enclosure body that releases air from the enclosure body.

The air in the air-inflatable support structure maintains an internal pressure in the air-inflatable support structure that permits the enclosure body to retain structural rigidity. The panel may comprise a plurality of holes. The panel may comprise a covering that controls an amount of air released from the enclosure body based on the air pressure in the interior chamber of the enclosure body. The panel may direct a portion of the air and a portion of the air-transferable chemical out of the enclosure body. The panel may comprise a carbon laced mesh panel.

A method comprising, directing air and an air-transferable chemical into an air-inflatable support structure of an enclosure body; releasing the air and air-transferable chemical into the enclosure body; determining whether a concentration of the air-transferable chemical in the air in the enclosure body is at a steady state of uniformity; and selectively releasing air from the enclosure body based on pressure. The air may occupy at least a minimum level of pressure and volume necessary to retain a structural rigidity of the air-inflatable support structure. The method may comprise mixing the air-transferable chemical to achieve the steady state of uniformity of concentration.

The mixing may comprise mixing the air-transferable chemical prior to directing the air-transferable chemical into the air-inflatable support structure. The mixing may comprise mixing the air-transferable chemical in the air-inflatable support structure. The mixing may comprise mixing the air-transferable chemical after releasing the air-transferable chemical into the enclosure body. The method may comprise performing a diagnostic test procedure in the enclosure body while the concentration of the air-transferable chemical in the enclosure body is at a steady state of uniformity. The method may comprise controlling an amount of the air-transferable chemical directed into the air-inflatable support structure and released into the enclosure body. The method may comprise selectively releasing enclosed air and the air-transferable chemical from the enclosure body.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4 is a schematic diagram illustrating a perspective view of the panel of the test chamber system of FIG. 3, according to an embodiment herein;

FIG. 5 is a schematic diagram illustrating a cross-sectional view of the panel of the test chamber system of FIG. 3 releasing air based on pressure, according to an embodiment herein;

FIG. 6 is a schematic diagram illustrating a cross-sectional view of the panel of the test chamber system of FIG. 3 releasing air and the air-transferable chemical, according to an embodiment herein;

FIG. 7 is a schematic diagram illustrating a perspective view of the panel of the test chamber system of FIG. 3 as a carbon laced test panel, according to an embodiment herein;

FIG. 8B is a flow diagram illustrating a method of mixing an air-transferable chemical, according to an embodiment herein;

FIG. 8C is a flow diagram illustrating a method of a first stage of mixing an air-transferable chemical, according to an embodiment herein;

FIG. 8D is a flow diagram illustrating a method of a second stage of mixing an air-transferable chemical, according to an embodiment herein;

FIG. 8E is a flow diagram illustrating a method of a third stage of mixing an air-transferable chemical, according to an embodiment herein;

FIG. 8F is a flow diagram illustrating a method of performing a diagnostic test procedure, according to an embodiment herein;

FIG. 8G is a flow diagram illustrating a method of controlling an amount of an air-transferable chemical, according to an embodiment herein;

DETAILED DESCRIPTION

Figure 1:
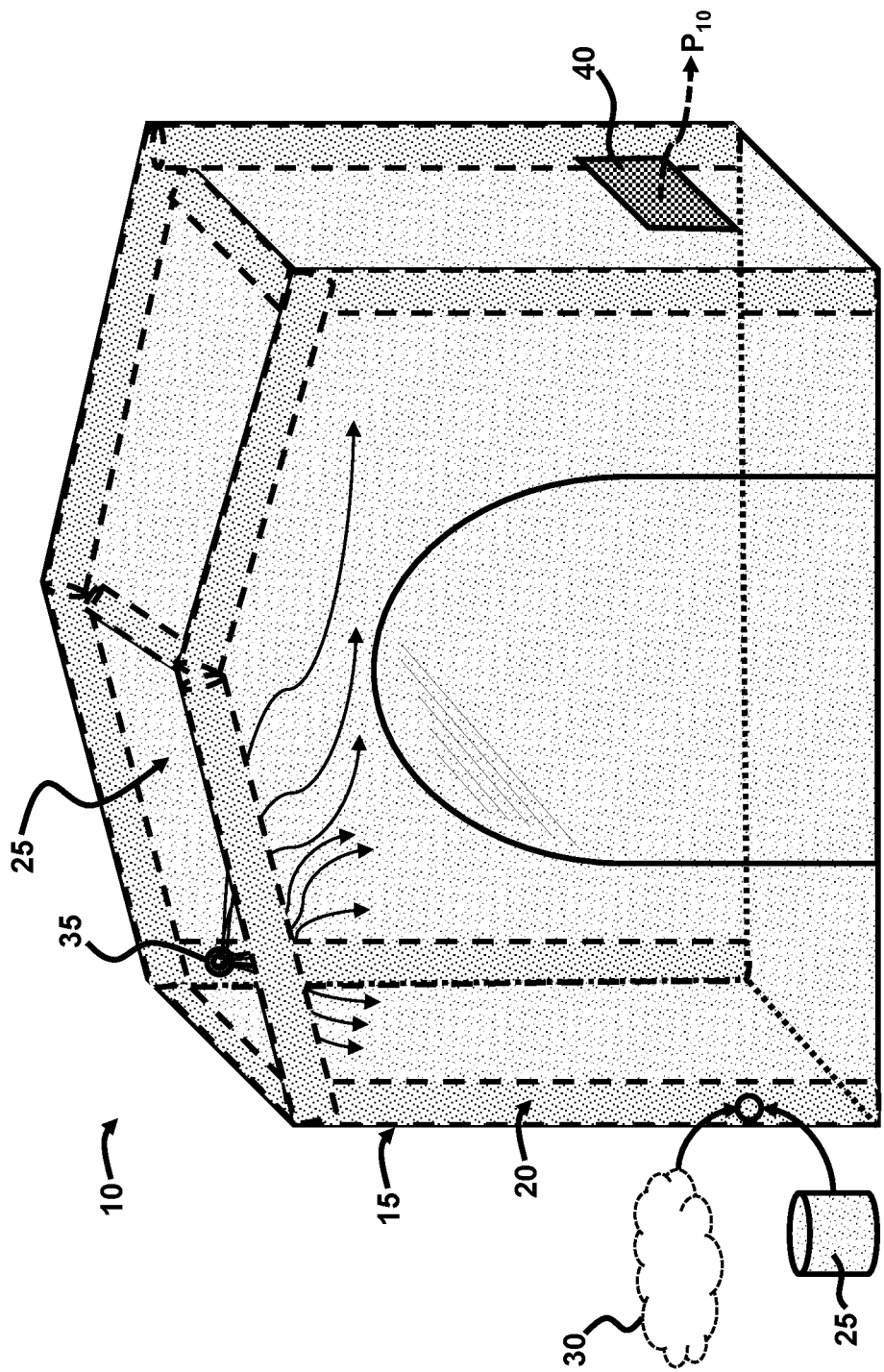
FIG. 1 is a schematic diagram illustrating a perspective view of an apparatus that provides uniform concentration of an air-transferable chemical, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a technique that provides a uniform simulant concentration by disseminating the simulant, which may be in the form of an aerosol, directly from an air-filled beam of a portable enclosure such as a tent. The simulant is disseminated into the portable enclosure to allow various types of diagnostic testing to be performed therein and where a uniform aerosol or chemical concentration is required. In an example, the diagnostic testing may involve protection factor (PF) testing of respiratory products such as respirators and gas masks. However, the embodiments herein are not restricted for use for this specific type of testing. Referring now to the drawings, and more particularly to FIGS. 1 through 12, where similar reference characters denote corresponding features consistently throughout the figures, there are shown preferred embodiments. In the drawings, the size and relative sizes of components, layers, and regions, etc. may be exaggerated for clarity.

FIG. 1 is a schematic diagram illustrating an apparatus 10 comprising an enclosure body 15 comprising an air-inflatable support structure 20 that receives an air-transferable chemical 25 and air 30 to maintain a substantially rigid structural integrity of the enclosure body 15. The apparatus 10 may be utilized for conducting diagnostic tests therein including allowing one or more users to be inside the apparatus 10 during the testing procedure. Accordingly, as described herein, the apparatus 10 may be "in operation" while a diagnostic test is being performed therein. The apparatus 10 may be a stand-alone apparatus or may be incorporated as part of another apparatus or system for performing diagnostic tests. In an example, the enclosure body 15 may be arranged as a protective tent enclosed on all sides including the top and bottom and with at least one access door or window, which may be zipped for closure/opening. The enclosure body 15 may be fully or partially transparent, translucent, or opaque, or a combination thereof, and may comprise any color. Furthermore, the enclosure body 15 may be ruggedized and weatherproof to withstand rain, snow, ice, and direct sunlight without degradation of its structure, according to some examples. The enclosure body 15 may comprise any size, shape, or configuration. In some examples, the enclosure body 15 may be sized to align with commercial off-the-shelf tents that are 10'×13'×8' in size or 25'×13'×10' in size. In some examples, the enclosure body 15 is composed of a lightweight material such as polyester fabric. Accordingly, the size and material of the enclosure body 15 permit the enclosure body 15 to be easily portable for use in various locations and environments. Moreover, the enclosure body 15 may be assembled and/or disassembled quickly to permit easy transportability and storage when not in use. In some examples, the enclosure body 15 may be tethered to the ground and/or another structure to ensure full stability of the apparatus 10.

The air-inflatable support structure 20 is an integral part of the enclosure body 15, In an example, the air-inflatable support structure 20 is positioned on the inside of the enclosure body 15 and forms the supporting structure of the enclosure body 15. In an example, the air-inflatable support structure 20 may be positioned along the inside edge or perimeter sides and/or top of the enclosure body 15. In other examples, the air-inflatable support structure 20 may be positioned at weight-bearing areas of the enclosure body 15. In an example, the air-inflatable support structure 20 may comprise an elongated shape such as a beam although the air-inflatable support structure 20 may comprise any size, shape, or configuration. In some examples, the air-inflatable support structure 20 may be a device that is composed of a lightweight material such as polyester fabric. Moreover, the air-inflatable support structure 20 comprises a stretchable material that expands/inflates by filling the air-inflatable support structure 20 with air 30 and contracts/deflates by releasing the air 30 therefrom. The air 30 may be ambient air from the environment and may be of any suitable ambient temperature surrounding the enclosure body 15. In another example, the air 30 may be compressed air retrieved from a suitable air source device.

Upon filling the air-inflatable support structure 20 with air 30, the air-inflatable support structure 20 becomes substantially rigid such that the air-inflatable support structure 20 provides structural support and stability to the enclosure body 15 in order to maintain the structural integrity of the enclosure body 15. The enclosure body 15 may have a sufficient structural integrity so long as the air-inflatable support structure 20 contains sufficient air 30 to provide the structural stability to keep the enclosure body 15 upright and in an intended orientation, configuration, and arrangement. The air-inflatable support structure 20 may be connected to an air source device (not shown in FIG. 1) that provides the air 30 into the air-inflatable support structure 20 using a tube, needle, or other connector for transferring of the air 30 into the air-inflatable support structure 20. Furthermore, the air-inflatable support structure 20 may be arranged in multiple sections or as a single continuous structure. In the example of the air-inflatable support structure 20 being arranged in multiple sections, each of the sections may be separately connected to an air source for receiving air 30 in order to inflate. The amount of air 30 required in the air-inflatable support structure 20 in order to maintain sufficient rigidity of the air-inflatable support structure 20 to provide sufficient structural stability of the enclosure body 15 may be dependent on the size of the enclosure body 15, the size of the air-inflatable support structure 20, the positioning of the air-inflatable support structure 20 in relation to the enclosure body 15, the flow rate of the air 30 through the air-inflatable support structure 20, and the number and configuration of the air-inflatable support structure 20, or a combination of these factors, among other factors.

The air-transferable chemical 25 may comprise any type of chemical including a simulant of toxic chemicals. In this regard, the air-transferable chemical 25 may comprise a substantially similar mass, volume, density, or other material properties of toxic chemicals. Furthermore, the air-transferable chemical 25 may have material properties that permit transfer of the air-transferable chemical 25 through the air such as an aerosol. Accordingly, in an example, the air-transferable chemical 25 may comprise an aerosol or aerosol simulant. In another example, the air-transferable chemical 25 may comprise a vapor or vapor simulant. The air-transferable chemical 25 may comprise any color. Moreover, the air-transferable chemical 25 may be a natural or anthropogenic chemical. According to some examples, the air-transferable chemical 25 may comprise corn oil, poly alpha olefin, salt fog, methyl salicylate (MeS), or combinations thereof, or other suitable chemicals and materials. In some examples, the air-transferable chemical 25 may be transferred into the air-inflatable support structure 20 using the same air source device or a different air source device that provides the air 30 into the air-inflatable support structure 20 and using the same or different tube, needle, or other connector that is used for transferring of the air 30 into the air-inflatable support structure 20. Furthermore, filters (not shown) may be utilized to ensure particulates that are larger than a threshold volume or shape do not enter the air-inflatable support structure 20.

The apparatus 10 also comprises a nozzle 35 connected to the air-inflatable support structure 20. The nozzle 35 may be positioned on the air-inflatable support structure 20 facing towards the inside of the enclosure body 15. The nozzle 35 releases the air containing the air-transferable chemical 25 from inside the air-inflatable support structure 20 into the interior chamber formed by enclosure body 15 for a selected period of time as a concentration of the air-transferable chemical 25 inside the enclosure body 15 is at a steady state of uniformity. While the nozzle 35 also releases the air 30 from the air-inflatable support structure 20 into the enclosure body 15, the air-inflatable support structure 20 is continuously receiving input air 30 from an air source while the apparatus 10 is in operation, so the air-inflatable support structure 20 is able to retain its structural integrity and thus retain the enclosure body 15 in its intended upright orientation. According to some examples, the nozzle 35 may comprise any of an electrical, mechanical, magnetic, or optical device, or combinations thereof. Furthermore, the nozzle 35 may comprise any type of material including plastic, metal, wood, polymer, or any other suitable material.

According to an example, the nozzle 35 may be integrated into and through the surface of the air-inflatable support structure 20. In an example, the nozzle 35 may have a threaded component onto which a retaining nut is screwed thereon. The threaded end is then pushed into the air-inflatable support structure 20 coming from inside of the enclosure body 15, and then another nut is installed on the backside of the threaded part of the nozzle 35 to effectively sandwich the material of the air-inflatable support structure 20 between the nuts and hold the nozzle 35 in place. The nozzle 35 may have a switching mechanism (not shown in FIG. 1) to open/close such that in an open configuration, the nozzle 35 releases the air containing the air-transferable chemical 25 from the air-inflatable support structure 20 into the interior of enclosure body 15. The switching mechanism may be automatically controlled by another device and/or may be manually controlled by a user. Furthermore, the nozzle 35 may comprise multiple nozzles 35 arranged in different locations on the air-inflatable support structure 20 to ensure uniformity of the concentration of the air-transferable chemical 25 that is released into the enclosure body 15. In an example, some of the nozzles 35 may be opened while others are closed in order to further control the release of the air-transferable chemical 25 and air 30 from the air-inflatable support structure 20 into the enclosure body 15. In an example, once the nozzle 35 is opened to release the air-transferable chemical 25 and the air 30 into the enclosure body 15, the nozzle 35 may remain opened for the duration of the operation of the apparatus 10. In another example, the nozzle 35 may be automatically or manually closed at any time to terminate the release of the air-transferable chemical 25 and the air 30 into the enclosure body 15 even while the apparatus 10 is in operation. In still another example, the nozzle 35 may be partially closed at any time to partially release the air-transferable chemical 25 and the air 30 into the enclosure body 15 while the apparatus 10 is in operation.

The apparatus 10 also includes a panel 40 integrated into the enclosure body 15 that passively releases air $P_{10}$ from inside the enclosure body 15 to maintain a pressure inside enclosure body 15 above atmospheric pressure. In an example, in order to release the air pressure $P_{10}$ from inside the enclosure body 15, the panel 40 may release some of the air-transferable chemical 25 and air 30 from inside the enclosure body 15. In an example, the enclosure body 15 comprises a slightly positive pressure compared to the ambient air pressure outside of the enclosure body 15, and thus air from outside of the enclosure body 15 does not enter into the enclosure body 15 through the panel 40. In other words, only the air-transferable chemical 25 and the air 30 enters the enclosure body 15 from the air-inflatable support structure 20 and exits the enclosure body 15 through the panel 40 without outside ambient air entering the enclosure body 15 from outside the enclosure body 15 through the panel 40. Additionally, no other materials, particulates, or chemicals enter into the enclosure body 15 through the panel 40 due to the slightly positive pressure inside the enclosure body 15. In some examples the panel 40 may comprise any of an electrical, mechanical, magnetic, or optical device, or combinations thereof, and may be automatically controlled by another device or controller and/or manually controlled by a user. The panel 40 may be positioned at any location of the enclosure body 15 and there may be multiple panels 40 according to some examples.

The configuration of the panel 40 may be selected to ensure that the flow rate of the air 30 (also carrying chemical 25) being released from the air-inflatable support structure 20 into the interior of enclosure body 15 is substantially the same as the flow rate of the air 30 being released from the interior of enclosure body 15 through the panel 40. Because the air 30 is lighter in weight than the air-transferable chemical 25, more air 30 compared to the air-transferable chemical 25 is released through the panel 40. Additionally, the release of the air 30 through the panel 40 helps ensure that the enclosure body 15 itself does not inflate. In an example, the release of the air-transferable chemical 25 from the air-inflatable support structure 20 into the enclosure body 15 through the nozzle 35 may occur for a selected period of time. The concentration of the air-transferable chemical 25 in the enclosure body 15 may reach a steady state of uniformity during this selected period of time of operating the apparatus 10. In an example, the selected period of time may be between 10-15 minutes of operation of the apparatus 10. However, the selected period of time may be dependent on various factors including the type of air-transferable chemical 25 that is being used, the configuration of the nozzle 35 (i.e., number, size of openings, location on the air-inflatable support structure 20), or the amount of air-transferable chemical 25 being purged through the panel 40, the type of diagnostic test that is being performed in the apparatus 10, or a combination of these factors, among other factors. Accordingly, the selected period of time may be different under different scenarios. Additionally, the determination of whether a steady state of uniformity of the concentration of the air-transferable chemical 25 has been achieved may be based on an allowable threshold range of the concentration of the air-transferable chemical 25 which must be uniform in order to perform the diagnostic test accurately. The allowable threshold range may be pre-established or may be established in real-time based on various parameters relating to the type and amount of air-transferable chemical 25 in the enclosure body 15 as well as the type of diagnostic test being conducted, or a combination of these factors, among other factors.

Figure 2:
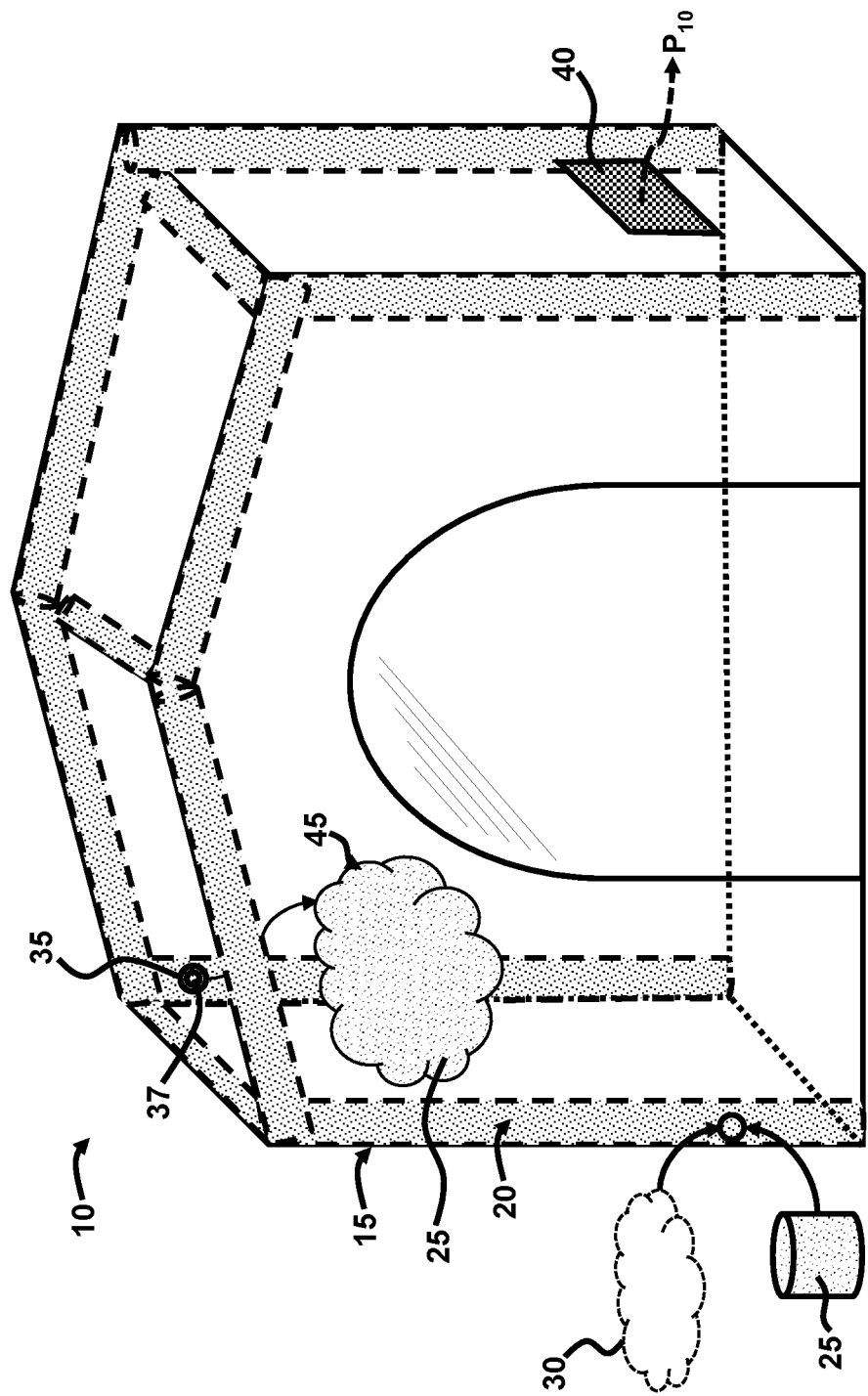
FIG. 2 is a schematic diagram illustrating a perspective view of the apparatus of FIG. 1 with the air-transferable chemical being directed at a specified location, according to an embodiment herein.

FIG. 2, with reference to FIG. 1, is a schematic diagram illustrating that the nozzle 35 may direct the air-transferable chemical 25 at a selected location 45 in the enclosure body 15. In this regard, the nozzle 35 may be set at a particular angle or may be adjustable to direct the air-transferable chemical 25 at a particular angle in order to direct the air-transferable chemical 25 at the selected location 45 in the enclosure body 15. In another example, the nozzles 35 may be automatically or manually adjusted to direct the air-transferable chemical 25 at the selected location 45 in the enclosure body 15. According to an example, multiple nozzles 35 may be utilized to direct the air-transferable chemical 25 at the selection location 45. Moreover, the selected location 45 may be any location inside the enclosure body 15 or the entirety of the inside of the enclosure body 15. In an example, the nozzle 35 may have one or more openings 37 that release the air-transferable chemical 25 and air 30 into the enclosure body 15. The number of nozzle(s) 35 as well as the placement of the nozzle(s) 35 on the air-inflatable support structure 20 may be selected based on the amount of air-transferable chemical 25 and air 30 that is desired to be released into the enclosure body 15 as well as based on the amount of air 30 required to retain the structural integrity of the air-inflatable support structure 20 in order to structurally support the enclosure body 15 and keep the enclosure body 15 in an upright orientation. Moreover, the number of nozzle(s) 35 as well as the placement of the nozzle(s) 35 on the air-inflatable support structure 20 may be selected based on flow rate of the air 30 that is directed into the air-inflatable support structure 20 as well as the size of the openings 37 in the nozzle 35, or a combination of these factors, among other factors.

Figure 3:
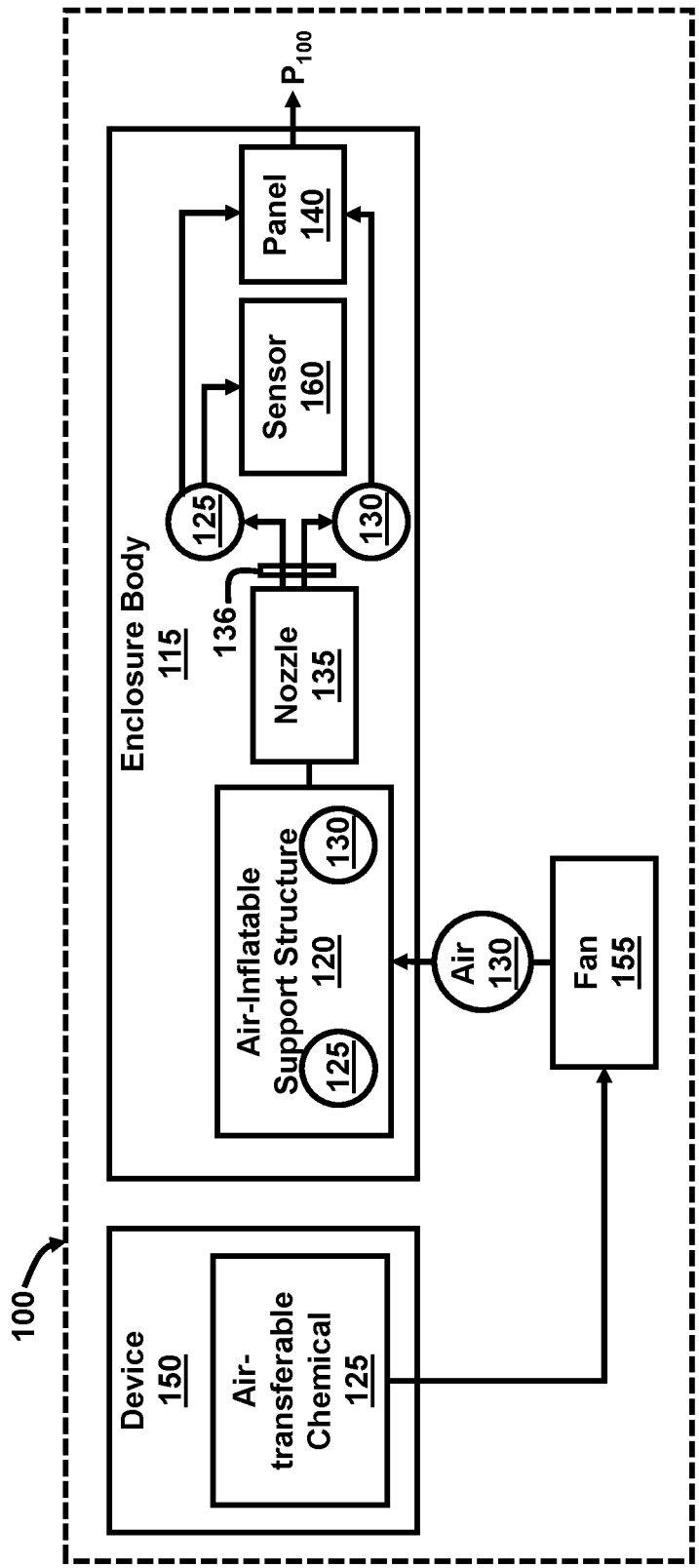
FIG. 3 is a block diagram illustrating a test chamber system, according to an embodiment herein.

FIG. 3, with reference to FIGS. 1 and 2, is a block diagram illustrating a test chamber system 100 comprising an enclosure body 115 comprising an air-inflatable support structure 120. The test chamber system 100 may be utilized for conducting diagnostic tests therein including allowing one or more users to be inside the test chamber system 100 during the testing procedure. Accordingly, as described herein, the test chamber system 100 may be "in operation" while a diagnostic test is being performed therein. The test chamber system 100 may be a stand-alone system or may be incorporated as part of another system or systems for performing diagnostic tests. In an example, the enclosure body 115 may be arranged as a protective tent enclosed on all sides including the top and bottom and with at least one access door or window, which may be zipped for closure/opening. The enclosure body 115 may be fully or partially transparent, translucent, or opaque, or a combination thereof, and may comprise any color. Furthermore, the enclosure body 115 may be ruggedized and weatherproof to withstand rain, snow, ice, and direct sunlight without degradation of its structure, according to some examples. The enclosure body 115 may comprise any size, shape, or configuration. In some examples, the enclosure body 115 may be sized to align with commercial off-the-shelf tents that are 10'×13'×8' in size or 25'×13'×10' in size. In some examples, the enclosure body 115 is composed of a lightweight material such as polyester fabric. Accordingly, the size and material of the enclosure body 115 permit the enclosure body 115 to be easily portable for use in various locations and environments. Moreover, the enclosure body 115 may be assembled and/or disassembled quickly to permit easy transportability and storage when not in use. In some examples, the enclosure body 115 may be tethered to the ground and/or another structure to ensure full stability of the test chamber system 100.

The air-inflatable support structure 120 is integral to the enclosure body 115. In an example, the air-inflatable support structure 120 is positioned inside of the enclosure body 115 and when inflated supports and establishes the shape and perimeter of the enclosure body 115. In some examples, the air-inflatable support structure 120 may be positioned along the inside edge or perimeter sides and/or top of the enclosure body 115. In other examples, the air-inflatable support structure 120 may be positioned at weight-bearing areas of the enclosure body 115. In an example, the air-inflatable support structure 120 may comprise elongated shapes such as beams and posts to create a structural framework for the enclosure body 115, although the air-inflatable support structure 120 may comprise any size, shape, or configuration. In some examples, the air-inflatable support structure 120 may be a mechanical device that is composed of a lightweight material such as polyester fabric. The amount of air 130 required in the air-inflatable support structure 120 in order to maintain sufficient rigidity of the air-inflatable support structure 120 to provide sufficient structural stability of the enclosure body 115 may be dependent on the size of the enclosure body 115, the size of the air-inflatable support structure 120, the positioning of the air-inflatable support structure 120 in relation to the enclosure body 115, the flow rate of the air 130 through the air-inflatable support structure 120, and the number and configuration of the air-inflatable support structure 120, or a combination of these factors, among other factors.

The test chamber system 100 also includes a device 150 for supplying an air-transferable chemical 125, which may be used to supply the air-transferable chemical 125 to the air-inflatable support structure 120. The device 150 may comprise any of an electrical, mechanical, magnetic, or optical device, or a combination thereof. Additionally, the device 150 may be automatically controlled by another device and/or may be manually controlled by a user. In an example, the device 150 may comprise a portable aerosol generator. The air-transferable chemical 125 may comprise any type of chemical including a simulant of toxic chemicals. In this regard, the air-transferable chemical 125 may comprise a substantially similar mass, volume, density, or other material properties of toxic chemicals. Furthermore, the air-transferable chemical 125 may have material properties that permit transfer of the air-transferable chemical 125 through the air such as an aerosol. Accordingly, in an example, the air-transferable chemical 125 may comprise an aerosol or aerosol simulant. In another example, the air-transferable chemical 125 may comprise a vapor or vapor simulant. The air-transferable chemical 125 may comprise any color. Moreover, the air-transferable chemical 125 may be a natural or anthropogenic chemical. According to some examples, the air-transferable chemical 125 may comprise corn oil, poly alpha olefin, salt fog, methyl salicylate (MeS), or combinations thereof, or other suitable chemicals and materials.

The test chamber system 100 further comprises a fan or blower 155 operatively connected to the air-inflatable support structure 120 and the device 150. The fan or blower 155 may comprise any of an electrical, mechanical, magnetic, or optical device, or a combination thereof. Additionally, the fan or blower 155 may be automatically controlled by another device and/or may be manually controlled by a user. The fan or blower 155 transfers the air-transferable chemical 125 and air 130 into the air-inflatable support structure 120. In some examples, the device 150 and fan/blower 155 may be integrally connected as a single device or may be separate discrete devices. For example, the device 150 may be connected to the inlet of the fan 155, which then directs the air-transferable chemical 125 from the device 150 as well as the air 130 into the air-inflatable support structure 120.

The air 130 in the air-inflatable support structure 120 may retain an inflation of the air-inflatable support structure 120 that permits the enclosure body 115 to retain structural rigidity. The air-inflatable support structure 120 comprises a material that expands/inflates by filling the air-inflatable support structure 120 with air 130 and contracts/deflates by withdrawing the air 130 therefrom. The air 130 may be ambient air from the environment and may be of any suitable ambient temperature surrounding the enclosure body 115. In another example, the air 130 may be compressed air retrieved from a suitable compressed air source device. While the test chamber system 100 is in operation, the fan 155 may be in continuous operation to transfer the air 130 into the air-inflatable support structure 120 while the device 150 may be selectively engaged; i.e., on demand by automatic control by another device or manually by a user, to inject the air-transferable chemical 125 into the air-inflatable support structure 120 at selective times and durations. Furthermore, filters (not shown) may be utilized to ensure particulates that are larger than a threshold volume or shape do not enter the air-inflatable support structure 120.

Upon filling the air-inflatable support structure 120 with air 130, the air-inflatable support structure 120 becomes substantially rigid such that the air-inflatable support structure 120 provides structural support and stability to the enclosure body 115 in order to maintain the structural integrity of the enclosure body 115. The enclosure body 115 may have a sufficient structural integrity so long as the air-inflatable support structure 120 contains sufficient air 130 to provide the structural stability to keep the enclosure body 115 upright and in an intended orientation, configuration, and arrangement. The air-inflatable support structure 120 may be connected to the fan 155 that provides the air 130 into the air-inflatable support structure 120 using a tube, needle, or other connector for transferring of the air 130 into the air-inflatable support structure 120. Furthermore, the air-inflatable support structure 120 may be arranged in multiple sections or as a single continuous structure. In the example of the air-inflatable support structure 120 being arranged in multiple sections, each of the sections may be separately connected to an air source for receiving air 130 in order to inflate.

The test chamber system 100 also comprises at least one nozzle 135 connected to the air-inflatable support structure 120. The at least one nozzle 135 opens causing the air-transferable chemical 125 and the air 130 to enter into the enclosure body 115. The at least one nozzle 135 may be positioned on the air-inflatable support structure 120 facing towards the inside of the enclosure body 115. In an example, the at least one nozzle 135 releases the air-transferable chemical 125 from the air-inflatable support structure 120 into the enclosure body 115 as a concentration of the air-transferable chemical 125 in the enclosure body 115 achieves a steady state of uniformity. The at least one nozzle 135 also releases the air 130 from the air-inflatable support structure 120 into the enclosure body 115. However, because the air-inflatable support structure 120 is continuously receiving air 130 from the fan 155 while the test chamber system 100 is in operation, the air-inflatable support structure 120 is able to retain its structural integrity and thus retain the enclosure body 115 in its intended upright orientation. According to some examples, the at least one nozzle 135 may comprise any of an electrical, mechanical, magnetic, or optical device, or combinations thereof. Furthermore, the at least one nozzle 135 may comprise any type of material including plastic, metal, wood, polymer, or any other suitable material.

According to an example, the at least one nozzle 135 may be integrated into and through the surface of the air-inflatable support structure 120. In an example, the at least one nozzle 135 may have a threaded component onto which a retaining nut is screwed thereon. The threaded end is then pushed into the air-inflatable support structure 120 coming from inside of the enclosure body 115, and then another nut is installed on the backside of the threaded part of the at least one nozzle 135 to effectively sandwich the material of the air-inflatable support structure 120 between the nuts and hold the at least one nozzle 135 in place. The at least one nozzle 135 may have a switching mechanism 136 to open/close such that in an open configuration, the at least one nozzle 135 releases the air-transferable chemical 125 from the air-inflatable support structure 120 into the enclosure body 115. The switching mechanism 136 may be automatically controlled or may be manually controlled by a user. In an example, the at least one nozzle 135 may have one or more openings (not shown in FIG. 3) that release the air-transferable chemical 125 and air 130 into the enclosure body 115. Furthermore, the at least one nozzle 135 may be arranged in different locations on the air-inflatable support structure 120 to ensure uniformity of the concentration of the air-transferable chemical 125 that is released into the enclosure body 115. In an example, some of the nozzles of the at least one nozzle 135 may be opened while others are closed in order to further control the release of the air-transferable chemical 125 and air 130 from the air-inflatable support structure 120 into the enclosure body 115. In an example, once the at least one nozzle 135 is opened to release the air-transferable chemical 125 and the air 130 into the enclosure body 115, the at least one nozzle 135 may remain opened for the duration of the operation of the test chamber system 100. In another example, the at least one nozzle 135 may be automatically or manually closed at any time to terminate the release of the air-transferable chemical 125 and the air 130 into the enclosure body 115 even while the test chamber system 100 is in operation. In still another example, the at least one nozzle 135 may be partially closed at any time to partially release the air-transferable chemical 125 and the air 130 into the enclosure body 115 while the test chamber system 100 is in operation.

The at least one nozzle 135 may be set at a particular angle or may be adjustable to direct the air-transferable chemical 125 at a particular angle in order to selectively direct the air-transferable chemical 125 in the enclosure body 115. In another example, the at least one nozzle 135 may be automatically or manually adjusted to direct the air-transferable chemical 125 at the selected location 45 in the enclosure body 115. Moreover, the number of nozzles of the at least one nozzle 135 as well as the placement of the at least one nozzle 135 on the air-inflatable support structure 120 may be selected based on the amount of air-transferable chemical 125 and air 130 that is desired to be released into the enclosure body 115 as well as based on the amount of air 130 required to retain the structural integrity of the air-inflatable support structure 120 in order to support the enclosure body 115 and keep the enclosure body 115 in an upright orientation. Moreover, the number of nozzles of the at least one nozzle 135 as well as the placement of the at least one nozzle 135 on the air-inflatable support structure 120 may be selected based on flow rate of the air 130 that is directed into the air-inflatable support structure 120 as well as the size of the opening(s) in the at least one nozzle 135. Furthermore, the amount and concentration of air-transferable chemical 125 in the enclosure body 115 may be controlled; i.e., increased, decreased, or retained at a constant amount, by adjusting the output of the device 150 and/or fan 155 that is directing the air-transferable chemical 125 into the air-inflatable support structure 120 for release into the enclosure body 115 by the at least one nozzle 135.

The test chamber system 100 further comprises a sensor 160 in the enclosure body 115 that detects whether a concentration of the air-transferable chemical 125 in the enclosure body 115 is at a steady state of uniformity. The sensor 160 may comprise any of an electrical, mechanical, magnetic, chemical, or optical device, or combinations thereof. For example, the sensor 160 may comprise an aerosol particle detector or counter. The determination of whether a steady state of uniformity of the concentration of the air-transferable chemical 125 has been achieved may be based on an allowable threshold range of the concentration of the air-transferable chemical 125 which must be uniform in order to perform the diagnostic test accurately. The allowable threshold range may be pre-established or may be established in real-time based on various parameters relating to the type and amount of air-transferable chemical 125 in the enclosure body 115 as well as the type of diagnostic test being conducted, or a combination of these factors, among other factors. The sensor 160 may be placed in any location inside the enclosure body 115 to detect whether the concentration of the air-transferable chemical 125 in the enclosure body 115 is at a steady state of uniformity. Moreover, the test chamber system 100 may contain multiple sensors 160 arranged in different locations in the enclosure body 115 such that each sensor 160 conducts its own detection of whether the concentration of the air-transferable chemical 125 in the enclosure body 115 is at a steady state of uniformity. In an example, the sensor 160 may be removably attached to the inside of the enclosure body 115. In another example, the sensor 160 may be placed on the bottom of the enclosure body 115 or on another piece of equipment, table, or other apparatus in the enclosure body 115. If the sensor 160 indicates that the concentration of the air-transferable chemical 125 in the enclosure body 115 has not achieved a steady state of uniformity, then the air-transferable chemical 125 is permitted to continue to be released at the same or increased flow rate into the enclosure body 115 until the sensor 160 detects that the concentration of the air-transferable chemical 125 in the enclosure body 115 has reached a steady state of uniformity.

The test chamber system 100 also comprises a panel 140 integrated into the enclosure body 115 that releases air $P_{100}$ to maintain pressure at a desired level from the enclosure body 115. In an example, in order to release the air pressure $P_{100}$ from the enclosure body 115, the panel 140 may release some of the air-transferable chemical 125 and air 130 from the enclosure body 115. In an example, the enclosure body 115 comprises a slightly positive pressure compared to the ambient air outside of the enclosure body 115, and thus air from outside of the enclosure body 115 does not enter into the enclosure body 115 through the panel 140. In other words, only the air-transferable chemical 125 and the air 130 enters the enclosure body 115 from the air-inflatable support structure 120 and exits the enclosure body 115 through the panel 140 without ambient air entering the enclosure body 115 from outside the enclosure body 115 through the panel 140. Additionally, no other materials, particulates, or chemicals enter into the enclosure body 115 through the panel 140 due to the slightly positive pressure inside the enclosure body 115. In some examples the panel 140 may comprise any of an electrical, mechanical, magnetic, or optical device, or combinations thereof, and may be automatically controlled by another device or controller, or manually controlled by a user. The panel 140 may be positioned at any location of the enclosure body 115 and there may be multiple panels 140 according to some examples.

The configuration of the panel 140 may be selected to ensure that the flow rate of the air 130 being released from the air-inflatable support structure 120 into the enclosure body 115 is substantially the same as the flow rate of the air 130 being released from the enclosure body 115 through the panel 140. Because the air 130 is lighter in weight than the air-transferable chemical 125, more air 130 compared to the air-transferable chemical 125 is released through the panel 140. Additionally, the release of the air 130 through the panel 140 helps ensure that the enclosure body 115 itself does not inflate. In an example, the release of the air-transferable chemical 125 from the air-inflatable support structure 120 into the enclosure body 115 through the at least one nozzle 135 may occur for a selected period of time. The concentration of the air-transferable chemical 125 in the enclosure body 115 may reach a steady state of uniformity during this selected period of time of operating the test chamber system 100, In an example, the selected period of time may be between 10-15 minutes of operation of the test chamber system 100. However, the selected period of time may be dependent on various factors including the type of air-transferable chemical 125 that is being used, the configuration of the at least one nozzle 135 (i.e., number, size of openings, location on the air-inflatable support structure 120), or the amount of air-transferable chemical 125 being purged through the panel 140, the type of diagnostic test that is being performed in the test chamber system 100, or a combination of these factors, among other factors. Accordingly, the selected period of time may be different under different scenarios.

FIG. 4, with reference to FIGS. 1 through 3, is a schematic diagram illustrating that the panel 140 may comprise a plurality of holes 165. The plurality of holes 165 may comprise any suitable size, shape, number, or configuration. Additionally, the plurality of holes 165 may comprise a variety of sizes, shapes, and configurations in the panel 140 such that the plurality of holes 165 are all of a uniform size, shape, and configuration, or may be configured with different sizes, shapes, and configurations. Furthermore, the plurality of holes 165 may be arranged in any selected pattern in the panel 140. Accordingly, the panel 140 may be configured as a mesh panel created by the plurality of holes 165.

FIG. 5, with reference to FIGS. 1 through 4, is a schematic cross-sectional diagram illustrating that the panel 140 may comprise a covering 170 that controls an amount of air pressure $P_{100}$ being released from the enclosure body 115. In an example, the covering 170 may be formed of lightweight material such as polyester fabric and may be formed of the same material as any of the enclosure body 115 and the air-inflatable support structure 120. The covering 170 may be removably attached to the panel 140 using retaining mechanisms such as tape, adhesives, snaps, buttons, zippers, hooks, or any type of synthetic closure or fastener mechanisms such as Velcro® fasteners. Accordingly, in some examples, the covering 170 may be selectively removed from the entire panel 140 or from portions of the panel 140 to open/close all or selective holes of the plurality of holes 165 to release the air pressure $P_{100}$ from the enclosure body 115, which allows for controlled release of the air pressure $P_{100}$ from the enclosure body 115.

FIG. 6, with reference to FIGS. 1 through 5, is a schematic cross-sectional diagram illustrating that the panel 140 may direct a portion of the air 130 and a portion of the air-transferable chemical 125 out of the enclosure body 115. Accordingly, in some examples, the covering 170 may be selectively removed from the entire panel 140 or from portions of the panel 140 to open/close all or selective holes of the plurality of holes 165 to direct a portion of the air 130 and a portion of the air-transferable chemical 125 out of the enclosure body 115. This may allow for controlled release of the air 130 out of the enclosure body 115.

FIG. 7, with reference to FIGS. 1 through 6, is a schematic diagram illustrating that the panel 140 may comprise a carbon laced mesh panel 175, In some examples, the carbon laced mesh panel 175 may be formed from carbon steel or stainless steel woven or welded together in a mesh pattern. Moreover, the carbon laced mesh panel 175 may have similar functionality as the plurality of holes 165 described above for the controlled release of the air pressure $P_{100}$ and the release of some of the air-transferable chemical 125 and air 130 out of the enclosure body 115. Carbon mesh provides the advantage of filtering certain gases and vapors.

Figure 8A:
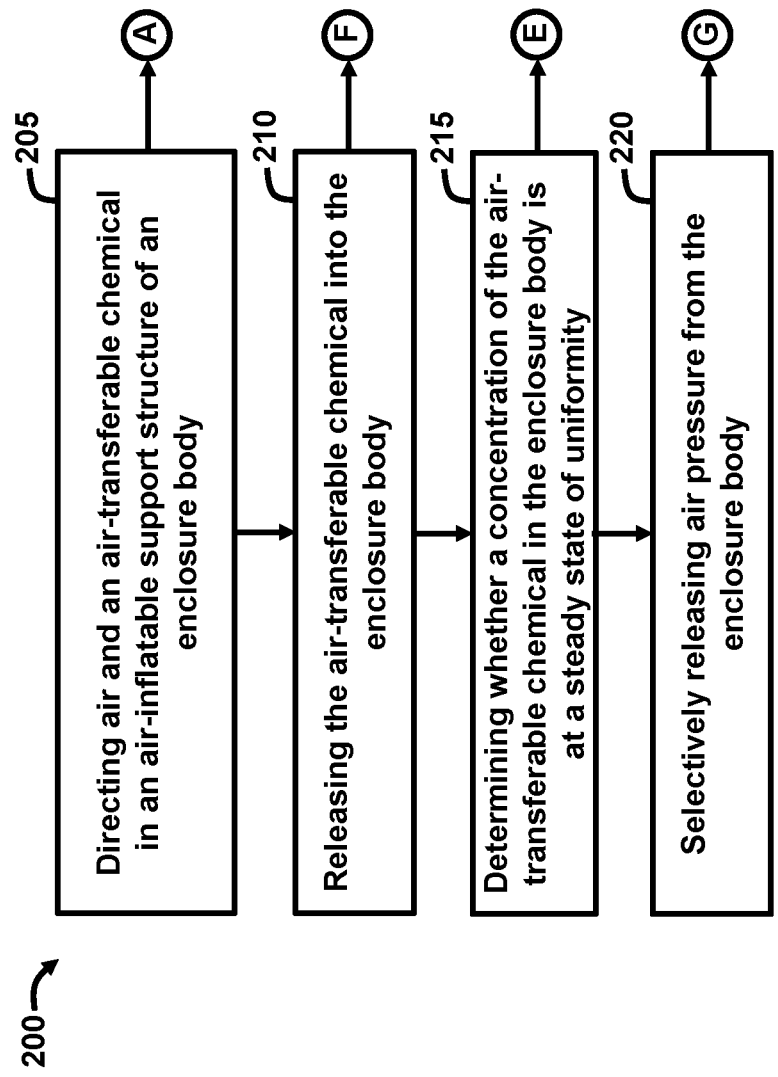
FIG. 8A is a flow diagram illustrating a method of providing uniform concentration of an air-transferable chemical, according to an embodiment herein.

FIG. 8A, with reference to FIGS. 1 through 7, is a flow diagram illustrating a method 200 comprising directing (205) air 30, 130 and an air-transferable chemical 25, 125 in an air-inflatable support structure 20, 120 of an enclosure body 15, 115. In an example, the air 30, 130 occupies at least a minimum level of volume necessary to retain a structural rigidity of the air-inflatable support structure 20, 120. The process of directing (205) the air 30, 130 and air-transferable chemical into the air-inflatable support structure 20, 120 may occur by manual operation of the device 150 and fan 155 by a user or by automatically controlling the device 150 and fan 155 by another device, machine, or mechanism including a smartphone, tablet device, or computer that may be positioned adjacent to or in the apparatus 10 or test chamber system 100, or may be remotely located from the apparatus 10 or test chamber system 100, and which transmits wired and/or wireless control signals accordingly. Furthermore, the device 150 and fan 155 may each comprise a processor (not shown) that is programmed to control the automatic actions/functions described herein.

The method 200 further comprises releasing (210) the air-transferable chemical 25, 125 into the enclosure body 15, 115. The process of releasing (210) the air-transferable chemical 25, 125 into the enclosure body 15, 115 may occur by manual operation of the nozzle 35 and the at least one nozzle 135 by a user or by automatically controlling the nozzle 35 and the at least one nozzle 135 by another device, machine, or mechanism including a smartphone, tablet device, or computer that may be positioned adjacent to or in the apparatus 10 or test chamber system 100, or may be remotely located from the apparatus 10 or test chamber system 100, and which transmits wired and/or wireless control signals accordingly. Furthermore, the nozzle 35 and the at least one nozzle 135 may comprise a processor (not shown) that is programmed to control the automatic actions/functions described herein.

The method 200 further comprises determining (215) whether a concentration of the air-transferable chemical 25, 125 in the enclosure body 15, 115 is at a steady state of uniformity. When the air 30, 130 is permitted to purge from the inside of the enclosure body 15, 115 through the panel 40, 140, the concentration of the air-transferable chemical 25, 125 inside the enclosure body 15, 115 reaches a steady state of uniformity. Moreover, this steady state may be controlled by the panel 40, 140 such as by the number, size, configuration, and arrangement of the plurality of holes 165 in the panel 140. The process of determining (215) whether a concentration of the air-transferable chemical 25, 125 in the enclosure body 15, 115 is at a steady state of uniformity may occur by manual operation of the sensor 160 by a user or by automatically controlling the sensor 160 by another device, machine, or mechanism including a smartphone, tablet device, or computer that may be positioned adjacent to or in the apparatus 10 or test chamber system 100, or may be remotely located from the apparatus 10 or test chamber system 100, and which transmits wired and/or wireless control signals accordingly. Furthermore, the sensor 160 may comprise a processor (not shown) that is programmed to control the automatic actions/functions described herein.

The method 200 further comprises selectively releasing (220) air pressure $P_{10}$, $P_{100}$ from the enclosure body 15, 115. The process of releasing (220) air pressure $P_{10}$, $P_{100}$, from the enclosure body 15, 115 may occur by manual operation of the panel 40, 140 by a user or by automatically controlling the panel 40, 140 by another device, machine, or mechanism including a smartphone, tablet device, or computer that may be positioned adjacent to or in the apparatus 10 or test chamber system 100, or may be remotely located from the apparatus 10 or test chamber system 100, and which transmits wired and/or wireless control signals accordingly. Furthermore, the panel 40, 140 may comprise a processor (not shown) that is programmed to control the automatic actions/functions described herein.

FIG. 8B, with reference to FIGS. 1 through 8A, is a flow diagram illustrating that the method 200 may comprise mixing (225) the air-transferable chemical 25, 125 to achieve the steady state of uniformity of concentration. In an example, this process of mixing (225) may occur in at least three stages to ensure that the concentration of the air-transferable chemical 25, 125 inside the enclosure body 15, 115 is uniformly mixed. FIG. 8C, with reference to FIGS. 1 through 8B, is a flow diagram illustrating that the mixing (225) may comprise mixing (230) the air-transferable chemical 25, 125 prior to directing the air-transferable chemical 25, 125 into the air-inflatable support structure 20, 120. This process of mixing (230) may occur when the air-transferable chemical 25, 125 hits the blades of the fan 155. FIG. 8D, with reference to FIGS. 1 through 8C, is a flow diagram illustrating that the mixing (225) may comprise mixing (235) the air-transferable chemical 25, 125 in the air-inflatable support structure 20, 120. Accordingly, this process of mixing (225) may occur when the air-transferable chemical 25, 125 propagates through the inside of the air-inflatable support structure 20, 120. FIG. 8E, with reference to FIGS. 1 through 8D, is a flow diagram illustrating that the mixing (225) may comprise mixing (240) the air-transferable chemical 25, 125 after releasing the air-transferable chemical 25, 125 into the enclosure body 15, 115. Accordingly, this process of mixing (240) occurs inside the enclosure body 15, 115 after the air-transferable chemical 25, 125 is released by the nozzle 35 and at least one nozzle 135, respectively into the enclosure body 15, 115.

FIG. 8F, with reference to FIGS. 1 through 8E, is a flow diagram illustrating that the method 200 may comprise performing (245) a diagnostic test procedure in the enclosure body 15, 115 while the concentration of the air-transferable chemical 25, 125 in the enclosure body 15, 115 is at a steady state of uniformity. Once the concentration of the air-transferable chemical 25, 125 in the enclosure body 15, 115 has stabilized and steady state has been achieved as detected by the sensor 160, the process of performing (245) the diagnostic test procedure in the enclosure body 15, 115 may be conducted as required using a variety of different types of data acquisition systems used in the industry. The diagnostic test procedure may last for any duration of time, and accordingly, the apparatus 10 and test chamber system 100 remains in operation for the duration of the diagnostic test procedure. In an example, the diagnostic test procedure may comprise a protective factor (PF) test that is performed to conduct tests on various structures, devices, equipment, clothing, gear, materials, and other mechanism that are used to protect users against various threats. Furthermore, the diagnostic test procedure may involve any other type of diagnostic test, particularly tests where the uniformity of the concentration of an air-transferable chemical 25, 125 is important.

In an example, the sensor 160 may be in continuous operation while the diagnostic test procedure is occurring to constantly monitor the concentration of the air-transferable chemical 25, 125 in the enclosure body 15, 115 in order to ensure that the steady state of uniformity of the concentration of the air-transferable chemical 25, 125 is maintained throughout the duration of the diagnostic test procedure. When the diagnostic test procedure is completed, the enclosure body 15, 115 may be fully purged of any remaining air-transferable chemical 25, 125 and air 30, 130 contained in the enclosure body 15, 115 by turning off the device 150 and fan 155, which allows the air-inflatable support structure 20, 120 to deflate, and for the enclosure body 15, 115 to fully collapse. Additionally, the door to the enclosure body 15, 115 may be opened to further assist in purging any remaining air-transferable chemical 25, 125 and air 30, 130 from the enclosure body 15, 115.

FIG. 8G, with reference to FIGS. 1 through 8F, is a flow diagram illustrating that the method 200 may comprise controlling (250) an amount of the air-transferable chemical 25, 125 directed into the air-inflatable support structure 20, 120 and released into the enclosure body 15, 115. In an example, the process of controlling (250) the amount of the air-transferable chemical 25, 125 directed into the air-inflatable support structure 20, 120 and released into the enclosure body 15, 115 may occur for any duration of time in order to reach the steady state of uniformity of concentration of the air-transferable chemical 25, 125 in the enclosure body 15, 115. Moreover, the process of controlling (250) the amount of the air-transferable chemical 25, 125 directed into the air-inflatable support structure 20, 120 and released into the enclosure body 15, 115 may occur for the entire duration of conducting the diagnostic test procedure, according to an example.

Figure 8H:
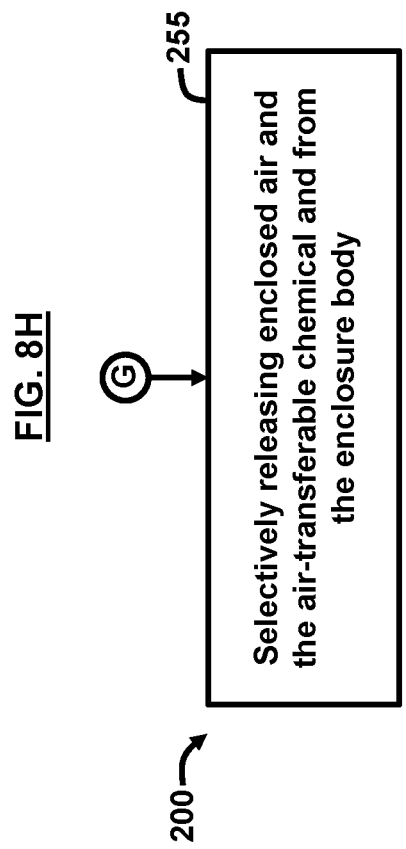
FIG. 8H is a flow diagram illustrating a method of selectively releasing air and an air-transferable chemical from an enclosure body, according to an embodiment herein.
Figure 9:
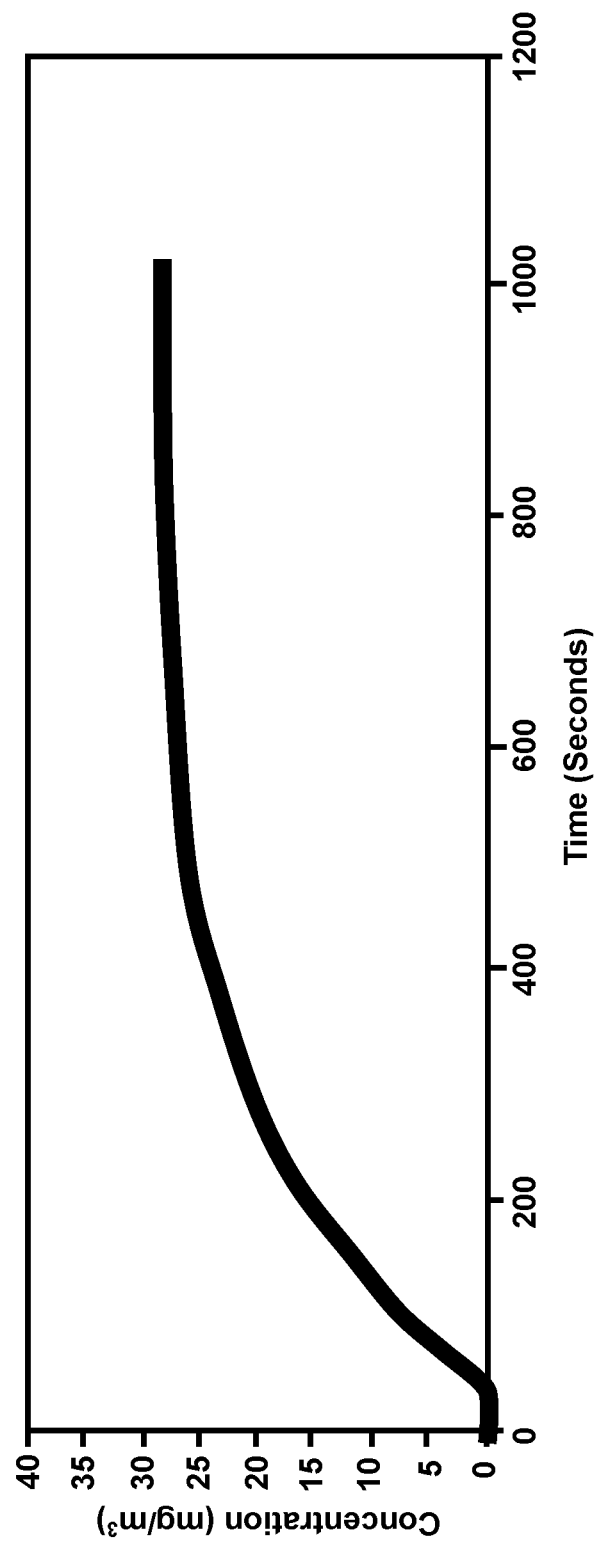
FIG. 9 is a graph of experimental results illustrating the time for achieving a steady state uniform concentration of an air-transferable chemical, according to an embodiment herein.
Figure 10:
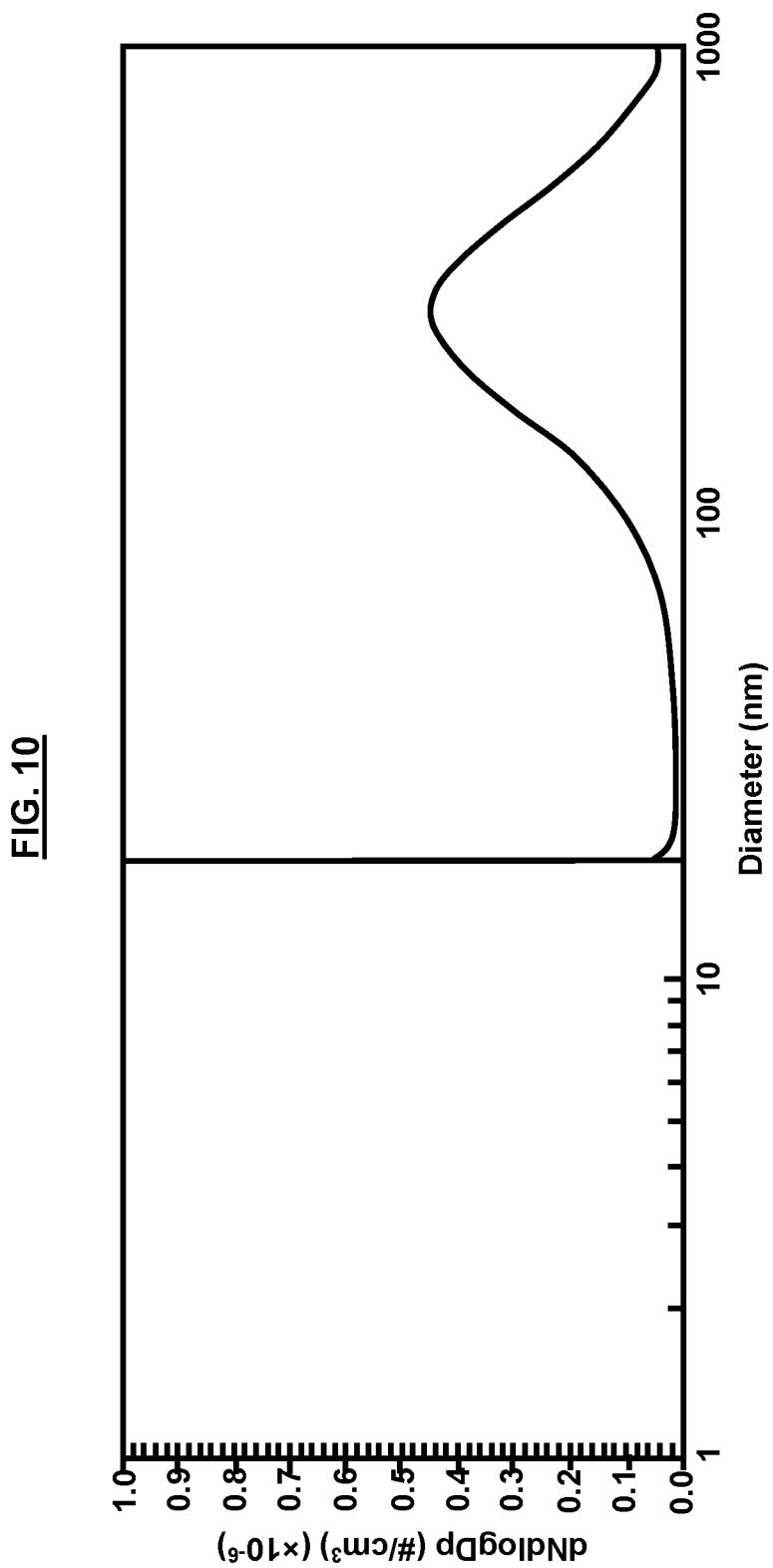
FIG. 10 is a graph of experimental results illustrating the mass of a particle of an air-transferable chemical upon achieving a steady state uniform concentration, according to an embodiment herein.
Figure 11:
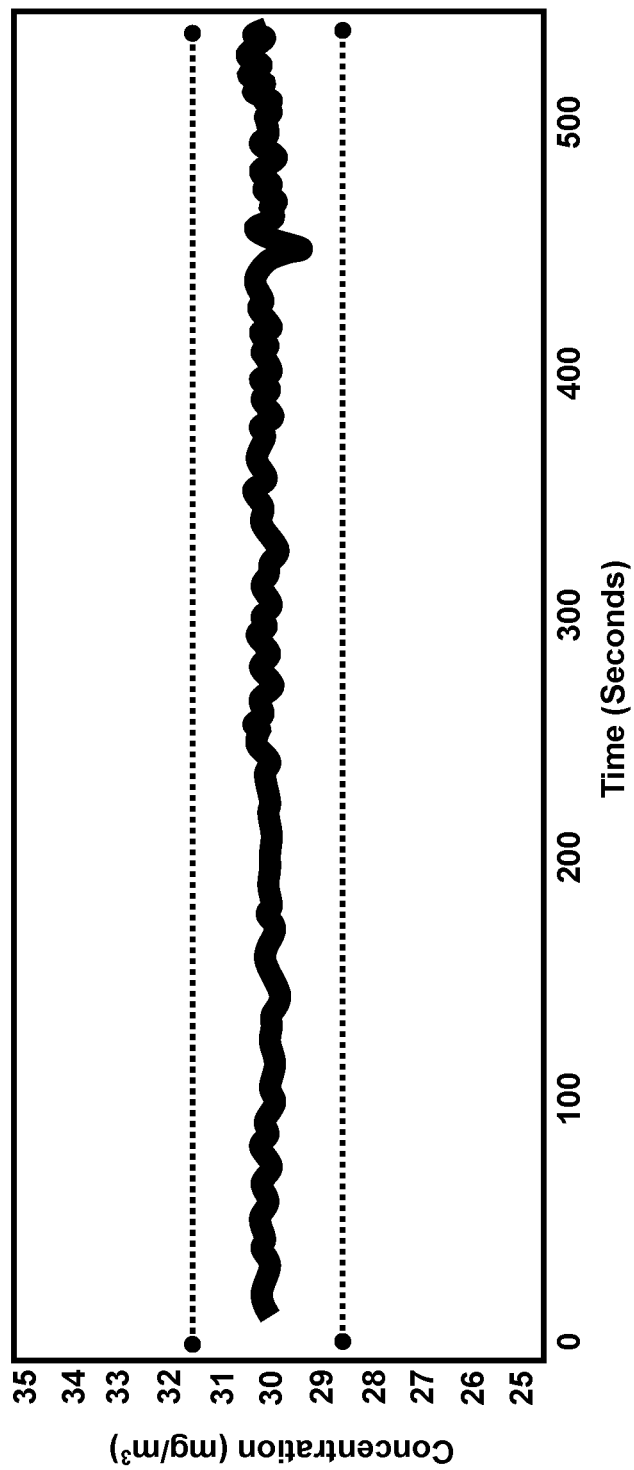
FIG. 11 is a graph of experimental results illustrating the uniformity of the concentration of an air-transferable chemical in various locations in a test chamber, according to an embodiment herein.
Figure 12:
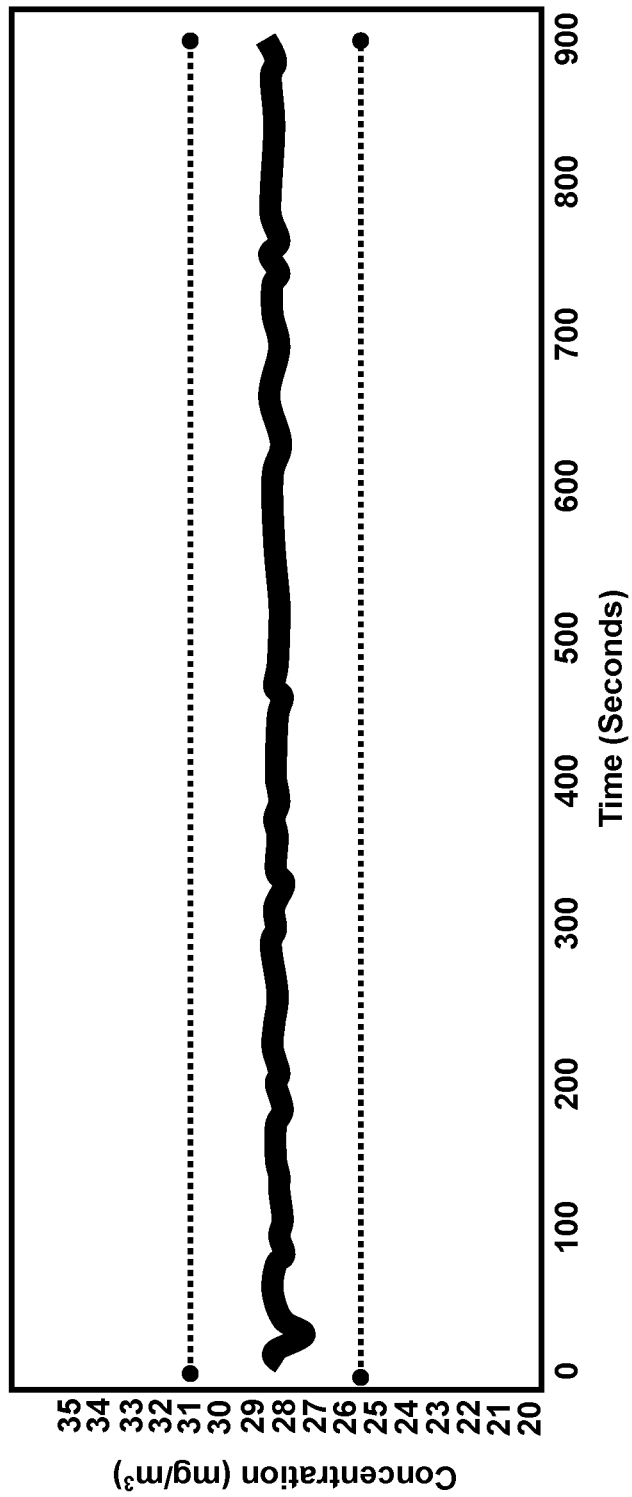
FIG. 12 is a graph of experimental results illustrating the uniformity of the concentration of an air-transferable chemical in a test chamber over the course of a selected time frame, according to an embodiment herein.

FIG. 8H, with reference to FIGS. 1 through 8G, is a flow diagram illustrating that the method 200 may comprise selectively releasing (255) enclosed air 130 and the air-transferable chemical 25, 125 from the enclosure body 15, 115. In an example, the process of releasing (255) enclosed air 130 and the air-transferable chemical 25, 125 from the enclosure body 15, 115 may occur for any duration of time in order to reach the steady state of uniformity of concentration of the air-transferable chemical 25, 125 in the enclosure body 15, 115. Moreover, the process of releasing (255) enclosed air 130 and the air-transferable chemical 25, 125 from the enclosure body 15, 115 may occur for the entire duration of conducting the diagnostic test procedure, according to an example.

EXPERIMENTS

An excerpt from the 1992 Joint Service Standard for Conducting Protective Factor (PF) Testing Referencing Aerosol Uniformity Requirements states:

"3.2 The test challenge shall be a non-toxic corn oil aerosol approved for human use.

3.2.1 The test chamber aerosol concentration shall be between 20 and 40 mg/m$^3$ with a Mass Median Aerodynamic Diameter (MMAD) of 0.4 to 0.6 μm. The geometric standard deviation shall be less than 2.0. The test chamber shall be capable of maintaining spatial uniformity within +5 percent in the vicinity of the respirator being tested. The challenge aerosol concentration shall not vary as a function of time more than +10 percent over the duration of a single test (approximately 15 minutes)."

Experiments were conducted to validate the validity of the techniques provided by the embodiments herein to ensure that the concentration and particle size of the air-transferable chemical 25, 125 inside the enclosure body 15, 115 were in compliance with the Joint Service Standard described above. As indicated below, the embodiments herein were experimentally verified to meet the Joint Service Standard. The specific parameters, values, amounts, ranges, materials, types, brands, etc. described below are approximates and were merely selected for the experiments, and as such the embodiments herein are not limited to the specific descriptions below.

Requirement 1: Chamber concentration shall be between 20-40 mg/m$^3$ for PF testing.

Verification: A TSI® DustTrak™ aerosol monitor (available from TSI Incorporated, Minnesota, USA) may be used to monitor the concentration inside the enclosure body 15, 115 as soon as the aerosol generator is turned on. The enclosure body 15, 115 is allowed to reach a steady state and the concentration is recorded at that time. Time is also recorded as to when the minimum concentration required to start testing is achieved. At the time of steady state, the concentration is within the range requirement of 20-40 mg/m$^3$. FIG. 9 is a graph that illustrates the concentration of the air-transferable chemical 25, 125 as a function of time. A steady state of the concentration of at least 20 mg/m$^3$ begins to occur at approximately 280 seconds, and at approximately 780 seconds the concentration of approximately 28 mg/m$^3$ begins to level off.

Requirement 2: Aerosol shall have an MMAD between 0.4-0.6 μm with a standard deviation less than 2.

Verification: Once the air-transferable chemical 25, 125 is injected into the apparatus 10 and a test chamber system 100, a TSI® Electrostatic Classifier (available from TSI Incorporated, Minnesota, USA) may be used to characterize the air-transferable chemical 25, 125. Upon testing, the air-transferable chemical 25, 125 meets the requirement with a MMAD of approximately 0.5472 μm. The standard deviation is also less than 2. Table 1 below shows the testing results and FIG. 10 illustrates the graphical plot of the data taken at 58.7% relative humidity, 24.2° C., and 101.3 kPa pressure.

TABLE 1

| Particle Size Verification | | | | | |
|---|---|---|---|---|---|
| | Number Particle Size | Diameter Particle Size | Surface Particle Size | Volume Particle Size | Mass Particle Size |
| Median (μm) | 0.2622 | 0.3491 | 0.4475 | 0.5472 | 0.5472 |
| Mean (μm) | 0.2958 | 0.3846 | 0.4742 | 0.5581 | 0.5581 |
| Geo. Mean (μm) | 0.2525 | 0.3408 | 0.4305 | 0.5183 | 0.5183 |

Requirement 3: The test chamber shall provide aerosol concentration uniformity within +5% in the vicinity of the respirator being tested.

Verification: When the enclosure body 15, 115 achieves air-transferable chemical 25, 125 concentration steady state, a test participant enters the enclosure body 15, 115 with a TSI® DustTrak™ aerosol monitor (available from TSI Incorporated, Minnesota, USA) and begins taking air-transferable chemical 25, 125 samples in 30-second intervals at particular locations within the enclosure body 15, 115. 18 locations are used in the experiment. These locations are selected based on where test subjects would be placed while conducting actual PF testing. Once completed, the average of all of the samples was calculated. The average concentration of each 30 second sample location was then compared to the overall average and determined if it was within the 15% value of the overall average. It was experimentally determined that the enclosure body 15, 115 is able to meet this requirement. Table 2 below shows the testing results and FIG. 11 illustrates the graphical plot of the data.

TABLE 2

| Concentration Uniformity | | | |
|---|---|---|---|
| | Test Avg. (mg/m$^3$) | −5% (mg/m$^3$) | 5% (mg/m$^3$) |
| Point-to-Point | 30.11 | 28.603 | 31.613 |

Requirement 4: The test chamber concentration shall not vary more than 10% over the course of a 15-minute test.

Verification: During steady state operation, a TSI® DustTrak™ aerosol monitor (available from TSI Incorporated, Minnesota, USA) is set up with the sample line directly in the middle of the enclosure body 15, 115 and the sample time is set for 15 minutes. At the conclusion of the sample test, the overall average of the concentration is calculated. Each sample collected over the duration of the test is then compared to +10% of the overall average. It was experimentally determined that the enclosure body 15, 115 is able to meet this requirement. Table 3 below shows the testing results and FIG. 12 illustrates the graphical plot of the data.

TABLE 3

| Concentration Variance | | | |
|---|---|---|---|
| | Test Avg. (mg/m$^3$) | −10% (mg/m$^3$) | 10% (mg/m$^3$) |
| 15-minute Trial | 28.25 | 25.429 | 31.079 |

The embodiments herein provide a portable enclosure body 15, 115 that can be used as part of a mobile test apparatus 10 or test chamber system 100 for protective factor testing, or other types of diagnostic testing where the uniformity of the concentration of aerosols and chemicals is important. The embodiments herein are not limited to aerosol testing, but may be used for any type of simulant where concentration uniformity is required. The apparatus 10, test chamber system 100, and the method 200 provide for a rapidly deployable enclosure body 15, 115 that is lightweight, easy to transport to different sites, and can comply with the standard of aerosol concentration uniformity provided by the 1992 Joint Service Standard for Conducting Protection Factor Testing.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. An apparatus for testing protective devices, comprising:
    an enclosure body comprising an air-inflatable support structure that receives an air-transferable chemical and air within an interior of the air-inflatable support structure to inflate the air-inflatable support structure to support and maintain a substantially rigid structural integrity of the enclosure body, the enclosure body having an enclosed interior when the air-inflatable support structure is inflated;
    a nozzle connected to the air-inflatable support structure, wherein the nozzle releases the air and the air-transferable chemical from the interior of the air-inflatable support structure into the interior of the enclosure body for a selected period of time as a concentration of the air-transferable chemical in the interior of the enclosure body is at a steady state of uniformity; and
    a panel integrated into the enclosure body that passively releases air and air-transferable chemical from the interior of the enclosure body.

2. The apparatus of claim 1, wherein the air-transferable chemical comprises an aerosol.

3. The apparatus of claim 1, wherein the air-transferable chemical comprises a vapor.

4. The apparatus of claim 1, wherein the nozzle directs the air-transferable chemical at a selected location in the enclosure body.

5. The apparatus of claim 1, wherein the enclosure body is portable.

6. The apparatus of claim 1, wherein said air-inflatable support structure comprises elongated air-inflatable beams.

7. A test chamber system, comprising:
    an enclosure body comprising an air-inflatable support structure;
    a device for supplying an air-transferable chemical;
    a fan or blower operatively connected to the air-inflatable support structure and the device, wherein the fan or blower transfers the air-transferable chemical and air into an interior of the air-inflatable support structure;
    at least one nozzle connected to the air-inflatable support structure, wherein the at least one nozzle opens causing the air-transferable chemical and the air to exit the interior of the air-inflatable support structure and enter into an interior of the enclosure body;
    a sensor in the enclosure body that detects whether a concentration of the air-transferable chemical in the enclosure body is at a steady state of uniformity; and
    a panel integrated into the enclosure body that releases air from the interior of the enclosure body.

8. The test chamber system of claim 7, wherein the air in the interior of the air-inflatable support structure retains an inflation of the air-inflatable support structure that permits the enclosure body to retain structural rigidity.

9. The test chamber system of claim 7, wherein the panel comprises a plurality of holes.

10. The test chamber system of claim 7, wherein the panel comprises a covering that controls an amount of air released from the interior of the enclosure body.

11. The test chamber system of claim 7, wherein the panel directs a portion of the air and a portion of the air-transferable chemical out of the interior of the enclosure body.

12. The test chamber system of claim 7, wherein the panel comprises a carbon laced mesh panel.

13. A method for testing protective devices, comprising:
    directing air and an air-transferable chemical into an interior of an air-inflatable support structure of an enclosure body, the enclosure body having an interior;
    releasing some of the air and the air-transferable chemical from the interior of the air-inflatable support structure into the interior of the enclosure body;
    selectively releasing air from the interior of the enclosure body;
    determining whether a concentration of the air-transferable chemical in the interior of the enclosure body is at a steady state of uniformity; and
    performing a diagnostic test procedure on a protective device in the interior of the enclosure body while the concentration of the air-transferable chemical in the enclosure body is at a steady state of uniformity.

14. The method of claim 13, wherein the air and the air-transferable chemical directed into the interior of the air-inflatable support structure is at a pressure and volume of at least a minimum level necessary to retain a structural rigidity of the air-inflatable support structure.

15. The method of claim 13, further comprising mixing the air-transferable chemical and the air to achieve the steady state of uniformity of concentration of the air transferable chemical in the air.

16. The method of claim 15, wherein the mixing comprises mixing the air-transferable chemical and the air prior to directing the air-transferable chemical and air into the air-inflatable support structure.

17. The method of claim 15, wherein the mixing comprises mixing the air-transferable chemical and the air in the interior of the air-inflatable support structure.

18. The method of claim 15, wherein the mixing comprises mixing the air-transferable chemical and the air after releasing the air-transferable chemical and the air into the enclosure body.

19. The method of claim 13, comprising controlling an amount of the air-transferable chemical directed into the air-inflatable support structure and released into the interior of the enclosure body.

20. The method of claim 13, comprising selectively releasing enclosed air and the air-transferable chemical from the enclosure body.

* * * * *